US012108207B2

(12) United States Patent
Chamness et al.

(10) Patent No.: US 12,108,207 B2
(45) Date of Patent: Oct. 1, 2024

(54) AUDIO DEVICE TRANSDUCER ARRAY AND ASSOCIATED SYSTEMS AND METHODS

(71) Applicant: Sonos, Inc., Santa Barbara, CA (US)

(72) Inventors: Michael Chamness, Glouchester, MA (US); Mincang Liu, Shenzhen (CN)

(73) Assignee: Sonos, Inc., Santa Barbara, CA (US)

( * ) Notice: Subject to any disclaimer, the term of this patent is extended or adjusted under 35 U.S.C. 154(b) by 201 days.

(21) Appl. No.: 17/906,031

(22) PCT Filed: Mar. 10, 2020

(86) PCT No.: PCT/CN2020/078552
§ 371 (c)(1),
(2) Date: Sep. 9, 2022

(87) PCT Pub. No.: WO2021/179154
PCT Pub. Date: Sep. 16, 2021

(65) Prior Publication Data

US 2023/0124441 A1 Apr. 20, 2023

(51) Int. Cl.
*H04R 1/34* (2006.01)
*H04R 5/04* (2006.01)

(52) U.S. Cl.
CPC ............... *H04R 1/345* (2013.01); *H04R 5/04* (2013.01); *H04R 2201/403* (2013.01)

(58) Field of Classification Search
CPC .... H04R 1/345; H04R 5/04; H04R 2201/403; H04R 1/2857; H04R 1/30; H04R 1/403; H04R 2201/34
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |

(Continued)

FOREIGN PATENT DOCUMENTS

| | | | |
|---|---|---|---|
| CN | 107211227 | A | 9/2017 |
| EP | 1389853 | A1 | 2/2004 |

(Continued)

OTHER PUBLICATIONS

AudioTron Quick Start Guide, Version 1.0, Mar. 2001, 24 pages.

(Continued)

*Primary Examiner* — Tuan D Nguyen
(74) *Attorney, Agent, or Firm* — Fortem IP LLP

(57) ABSTRACT

Audio device transducer arrays and associated systems and methods are disclosed herein. In some examples, the audio device can comprise a housing including a baffle and an acoustically reflective plate spaced apart from and facing at least partially toward the baffle, such that the baffle and the plate define an opening therebetween. The audio device can further comprise an array of electroacoustic transducers disposed within or surrounded by the baffle and configured to emit acoustic waves toward the opening. The array of transducers can be configured to produce acoustic waves having a frequency of about 1.5 kilohertz (kHz) or greater.

21 Claims, 17 Drawing Sheets

(56) References Cited

U.S. PATENT DOCUMENTS

| | | | |
|---|---|---|---|
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2010/0061571 A1 | 3/2010 | Choi et al. | |
| 2014/0064550 A1 | 3/2014 | Wiggins | |
| 2016/0150318 A1 | 5/2016 | Donarski et al. | |
| 2017/0188134 A1* | 6/2017 | Lage | H04R 1/288 |
| 2017/0353786 A1* | 12/2017 | Button | H04R 29/004 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Bureau, International Search Report and Written Opinion mailed on Nov. 30, 2020, issued in connection with International Application No. PCT/CN2020/078552, filed on Mar. 10, 2020, 9 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *DM Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

AUDIO DEVICE TRANSDUCER ARRAY AND ASSOCIATED SYSTEMS AND METHODS

CROSS-REFERENCE TO RELATED APPLICATION

The present application is a 371 U.S. national phase application of International Application No. PCT/CN2020/078552, filed Mar. 10, 2020, which is incorporated by reference herein in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, embodiments, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
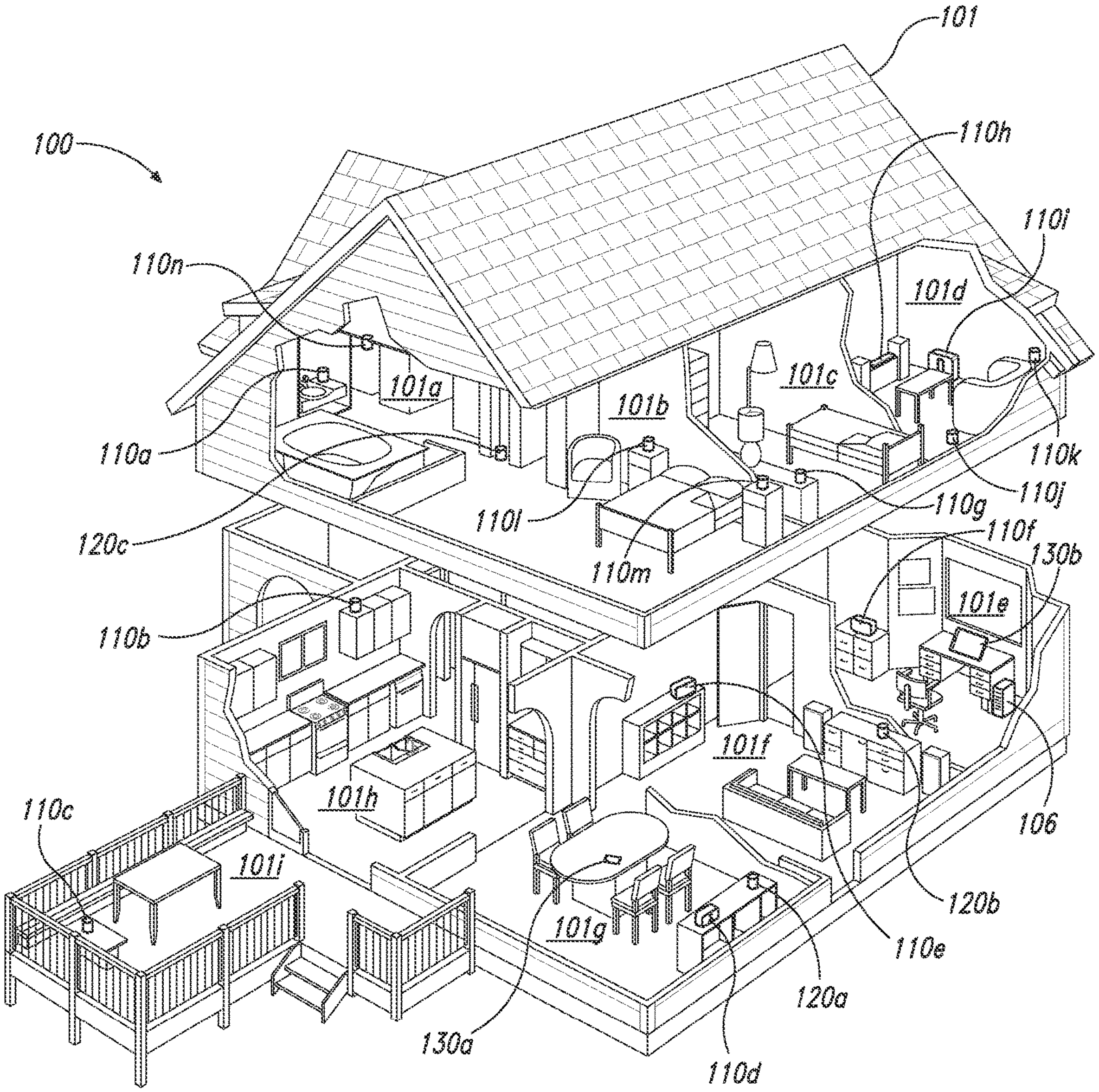
FIG. 1A is a partial cutaway view of an environment having a media playback system configured in accordance with examples of the disclosed technology.

The drawings are for the purpose of illustrating examples, but those of ordinary skill in the art will understand that the technology disclosed herein is not limited to the arrangements and/or instrumentality shown in the drawings.

DETAILED DESCRIPTION

I. Overview

Conventional transducers configured to produce acoustic waves at higher frequencies (e.g., above 1.5 kilohertz (kHz)) generally have a relatively narrow directivity in audio playback devices. As a result, the audio output produced from these transducers can have a lack of perceived spaciousness to the listener. This perceived spaciousness or angular dispersion of generated acoustic waves can be particularly desirable for playback devices that are designed to be used in non-reverberant environments (e.g., the outdoors). In such environments, a device is often not surrounded by walls, and thus adequate angular dispersion is necessary to ensure listeners at different angles around the device can all experience the same or similar quality of audio output regardless of their position relative to the device. Some attempts to mitigate this problem have utilized a single transducer, and a waveguide having an opening that is in fluid communication with the transducer. The opening can reduce a variation in intensity around the axis of acoustic waves generated by the transducer and emitted from the opening, thereby leading to wider dispersion. However, such embodiments may not be effective or optimal for producing stereo audio output that includes left and right channels.

Examples of the disclosed technology address at least some of the above described issues associated with spaciousness and directivity for multi-channel playback of audio content in wide dispersion playback devices. As explained in more detail elsewhere herein, some examples of the disclosed technology relate to a wide dispersion playback device or system comprising an array of transducers configured to individually produce acoustic waves. The device further comprises a housing containing the array of transducers, and including a first plate (e.g., an acoustically reflective plate or baffle) and a second plate facing at least partially toward the first plate to define an opening therebetween. Individual transducers of the array can be positioned adjacent one another, such as side-by-side with each transducer positioned within the first plate, or facing toward one another with each transducer positioned within separate plates. The opening is in fluid communication with the array of transducers such that the acoustic waves generated therefrom are emitted via the opening, which may cover a 180 degree or greater range. By placing the transducers adjacent one another in relatively close proximity to each other and opposite the first plate and/or the second plate, examples of the present technology can enable the acoustic patterns of the transducers to overlap and produce widely dispersed stereo output.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a*-n), one or more network microphone devices ("NMDs"), 120 (identified individually as NMDs 120*a*-*c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for example, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some examples, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
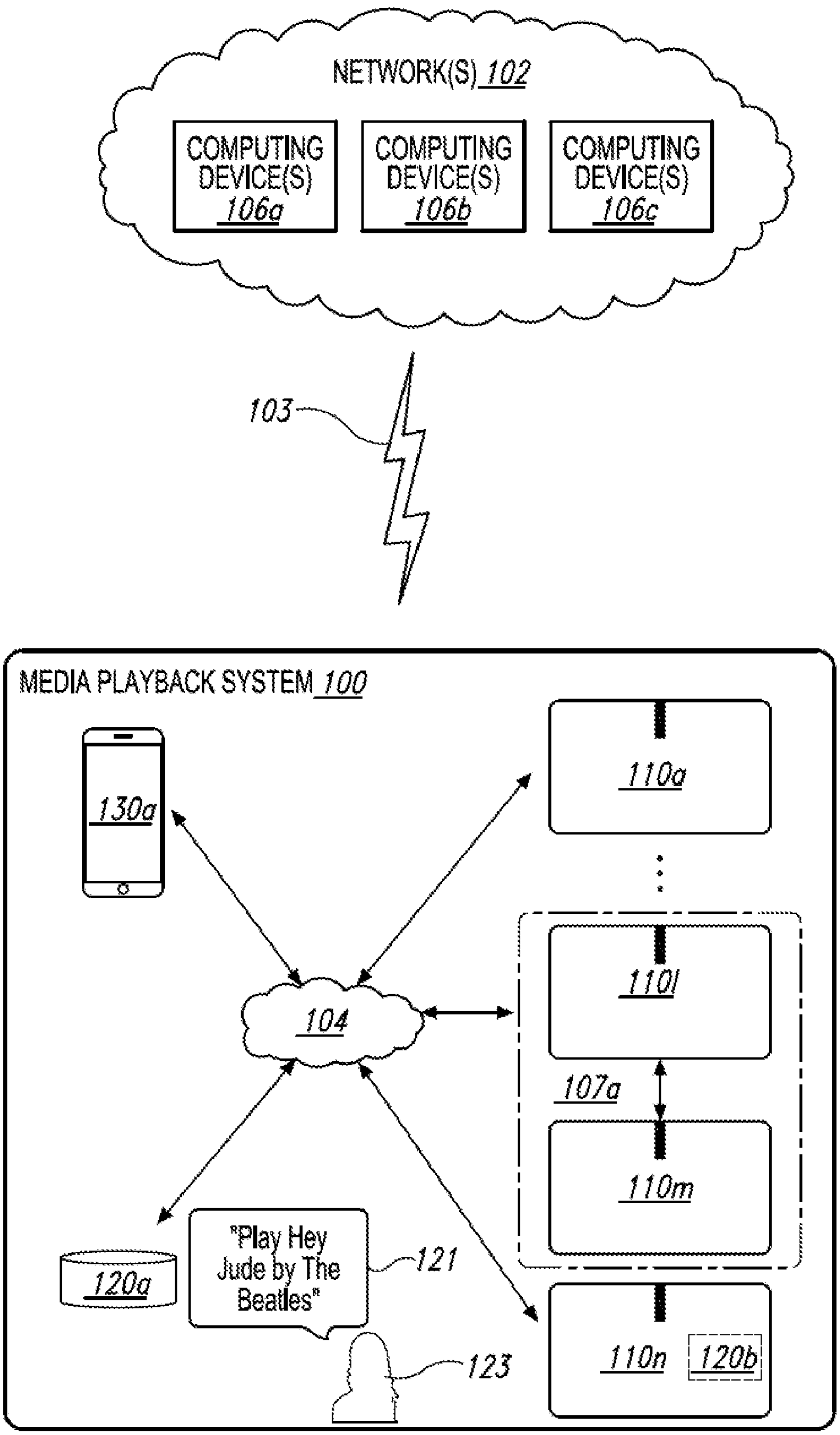
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for example, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
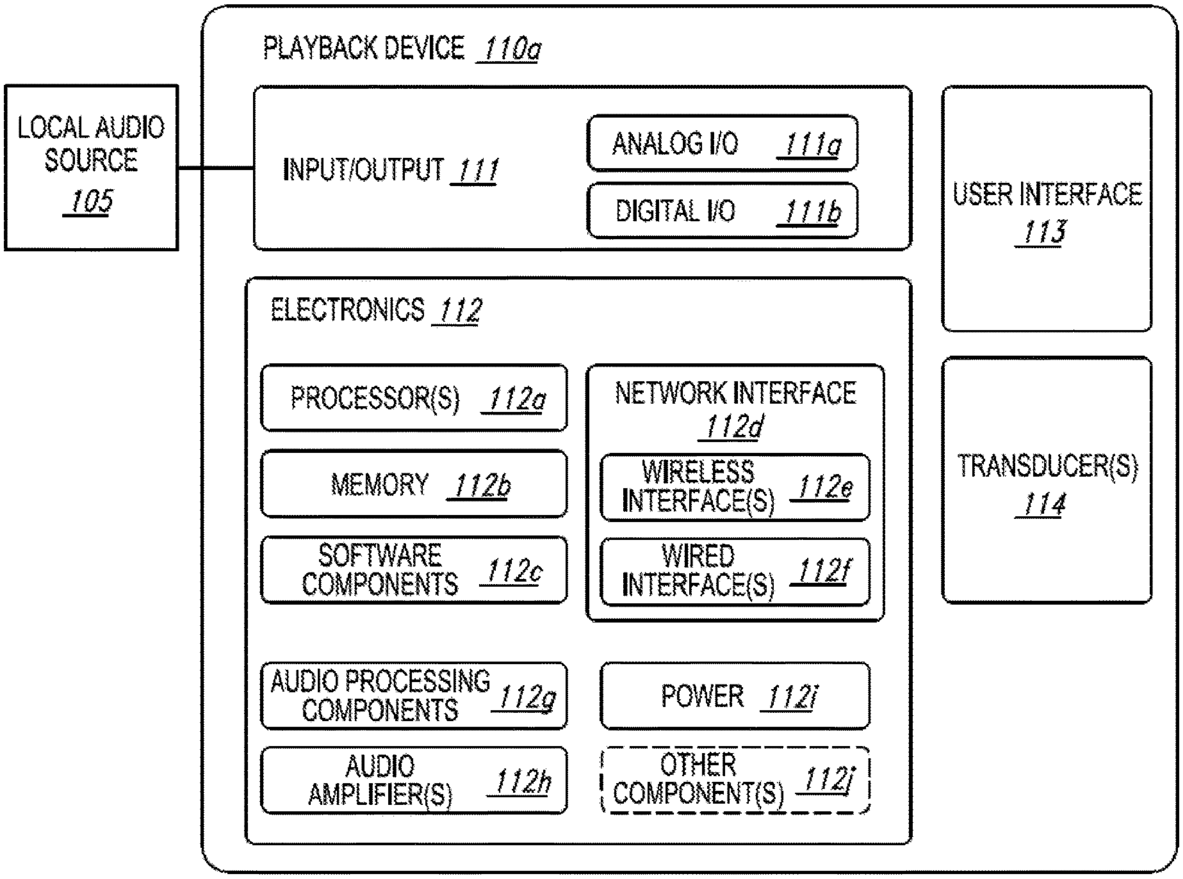
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors

112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
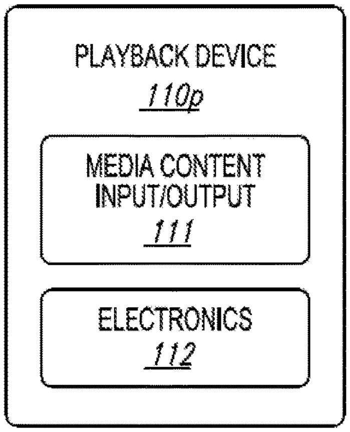
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of examples disclosed herein. Additionally, one of ordinary skilled in the art will appreciate that a playback device is not limited to the examples described herein or to SONOS product offerings. In some examples, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
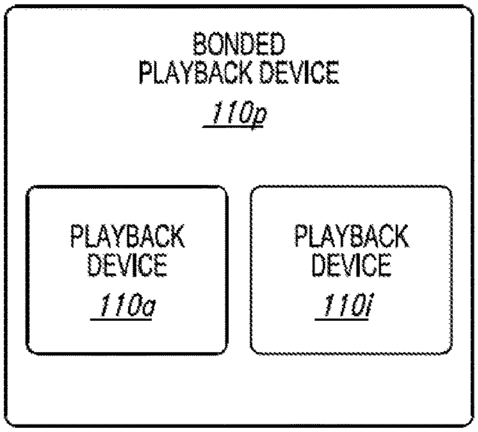
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
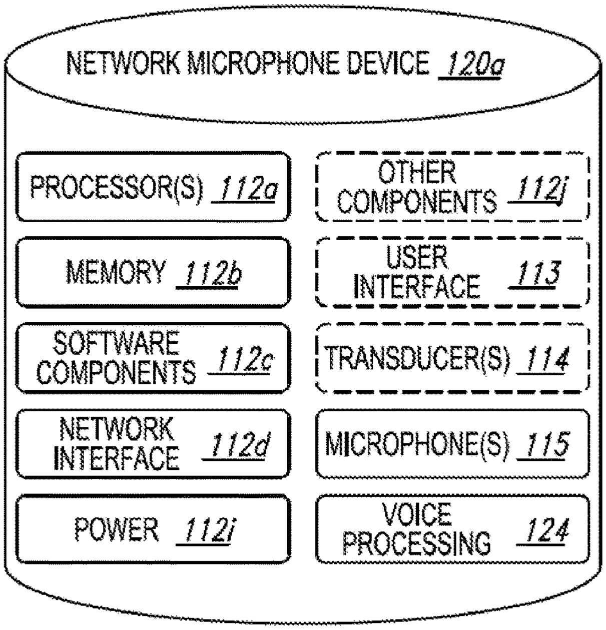
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for example, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
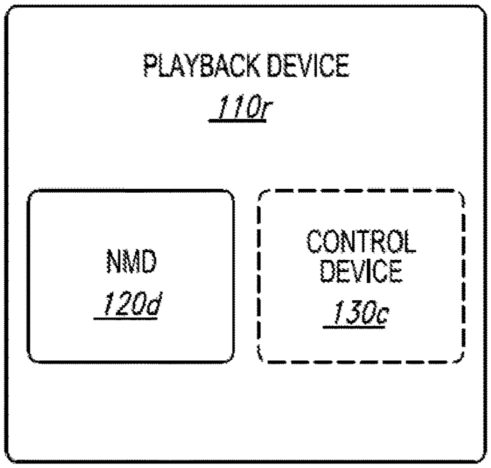
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
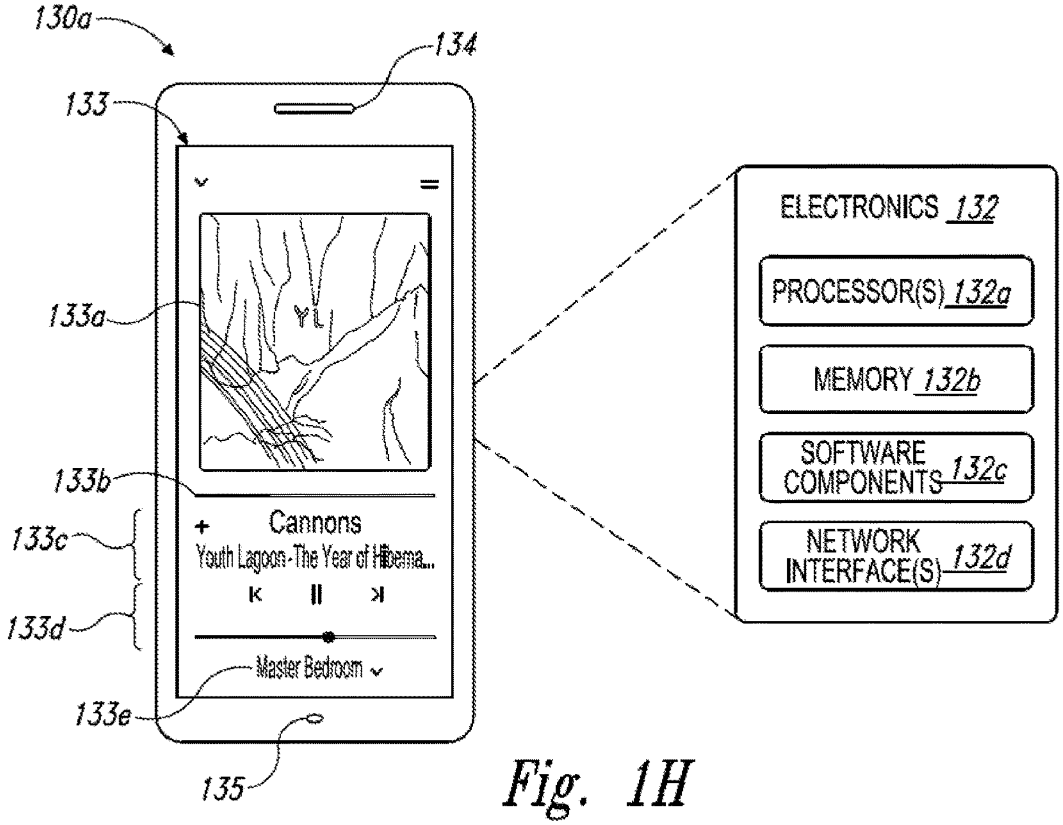
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
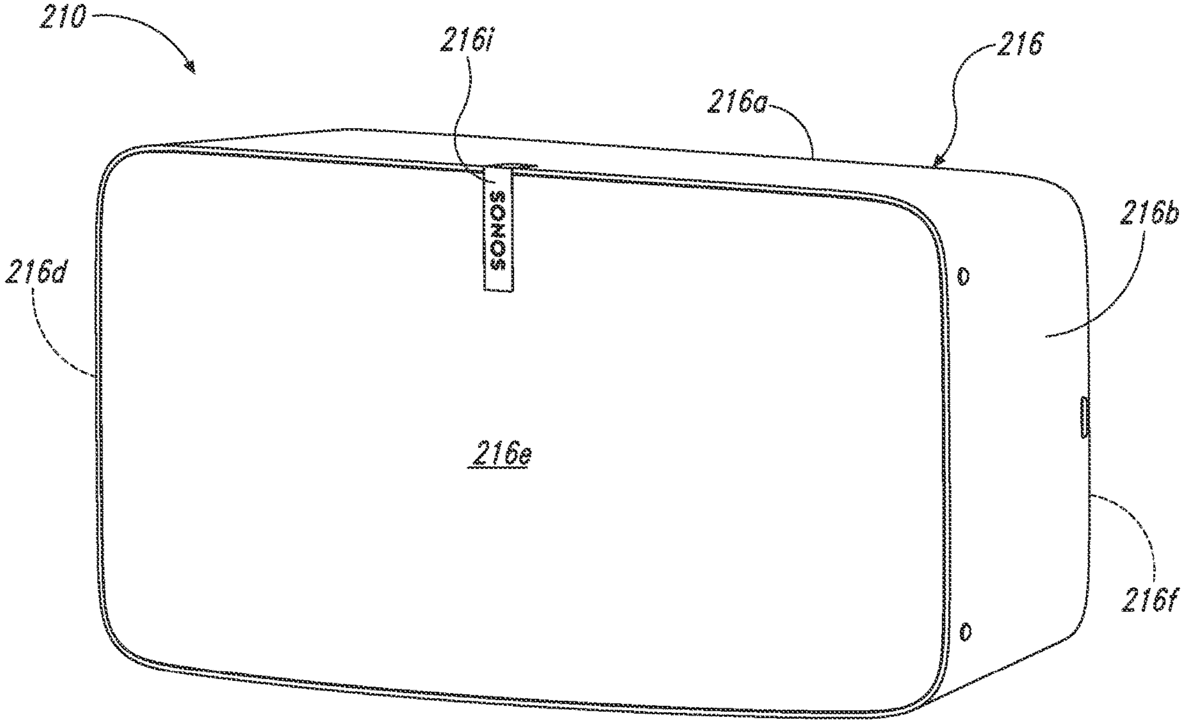
FIG. 2A is a front isometric view of a playback device configured in accordance with examples of the disclosed technology.
Figure 2B:
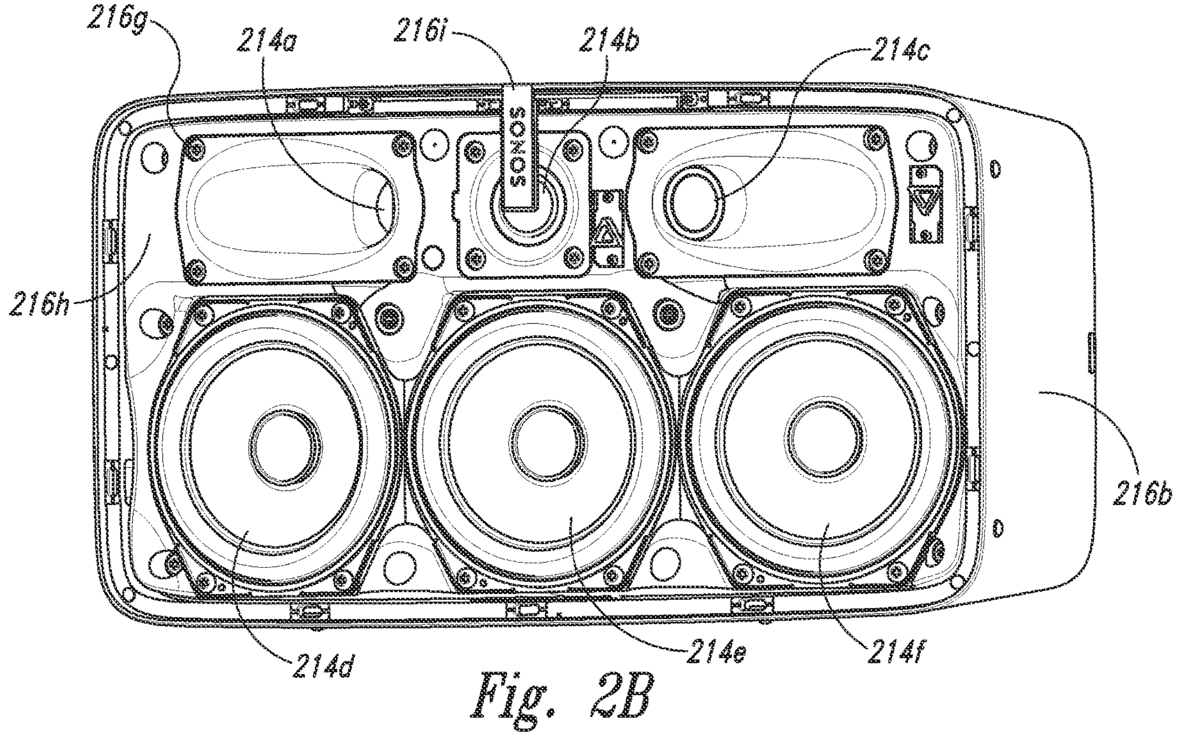
FIG. 2B is a front isometric view of the playback device of FIG. 2A without a grille.
Figure 2C:
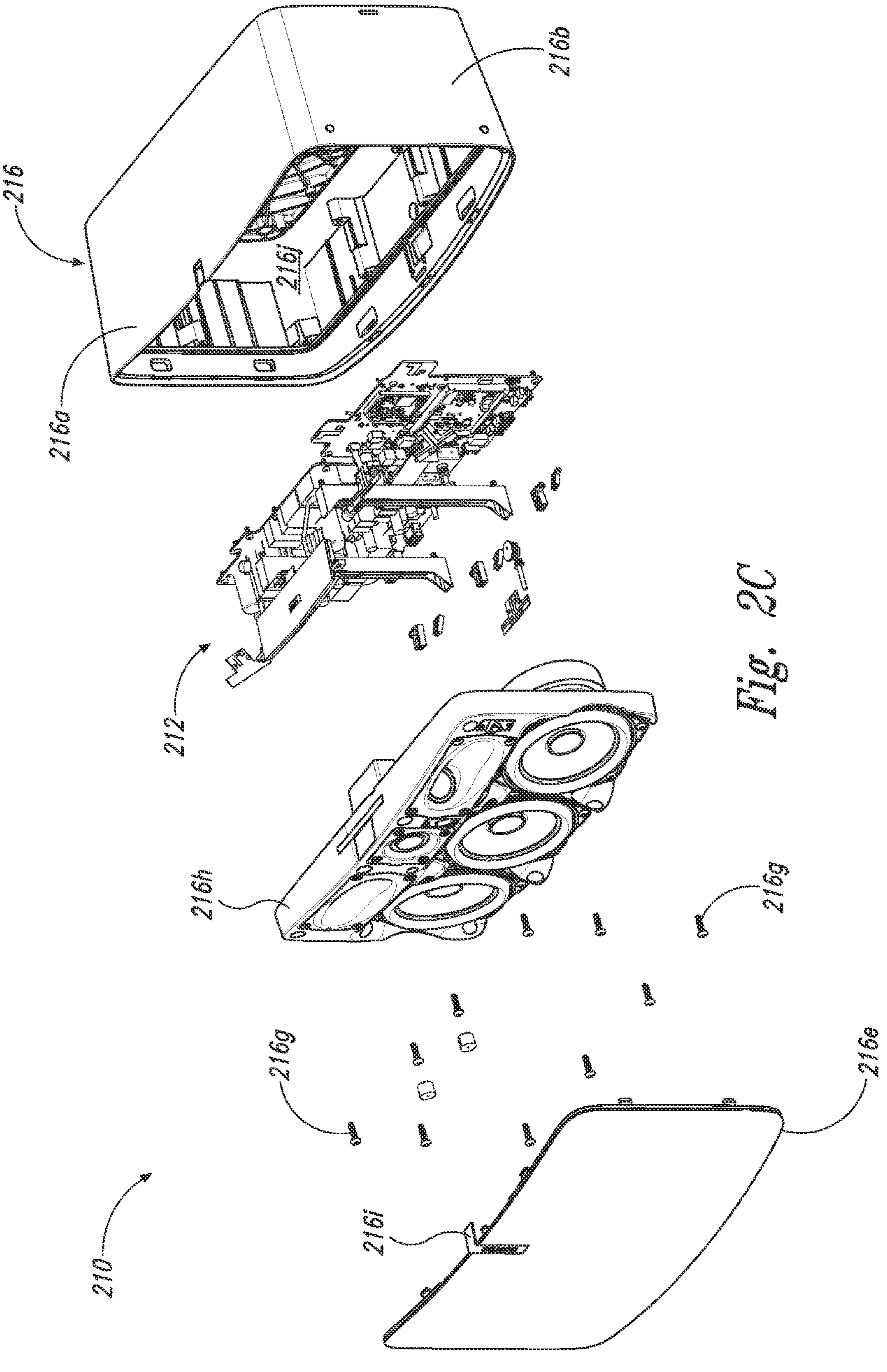
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
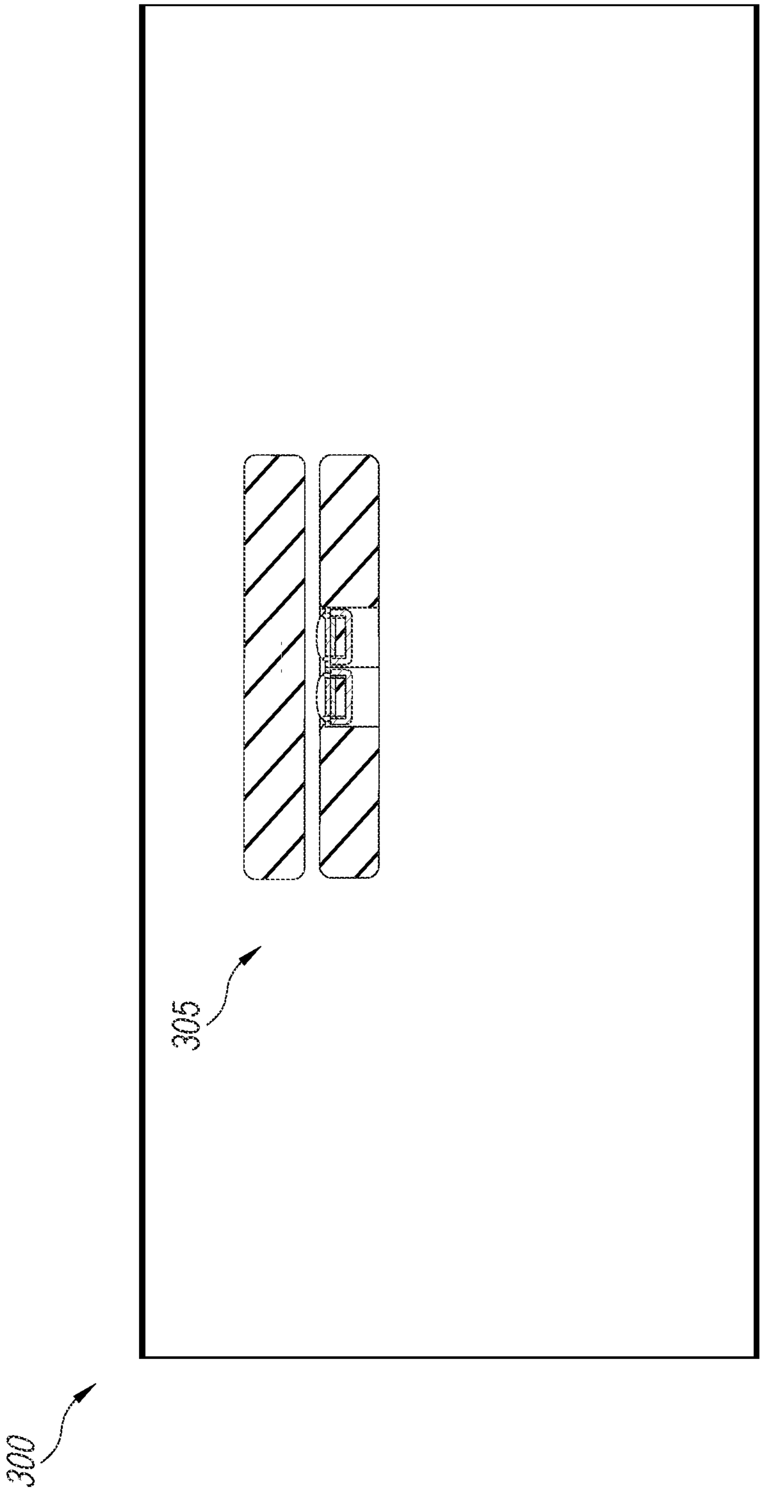
FIG. 3A is a partially schematic cross sectional side view of an audio playback device configured in accordance with examples of the present technology.

FIG. 3A is a partially schematic cross sectional side view of an audio playback device 300 configured in accordance with examples of the present technology. The device 300 can generally correspond to or be incorporated within any of the playback devices (e.g., playback devices 110, 120, or 210) previously described with reference to FIGS. 1A-2C). As shown in FIG. 3A, the device 300 can include an audio playback device 305 incorporated therein. As described in detail elsewhere herein, the device 305 can include multiple transducers positioned adjacent one another.

Figure 3B:
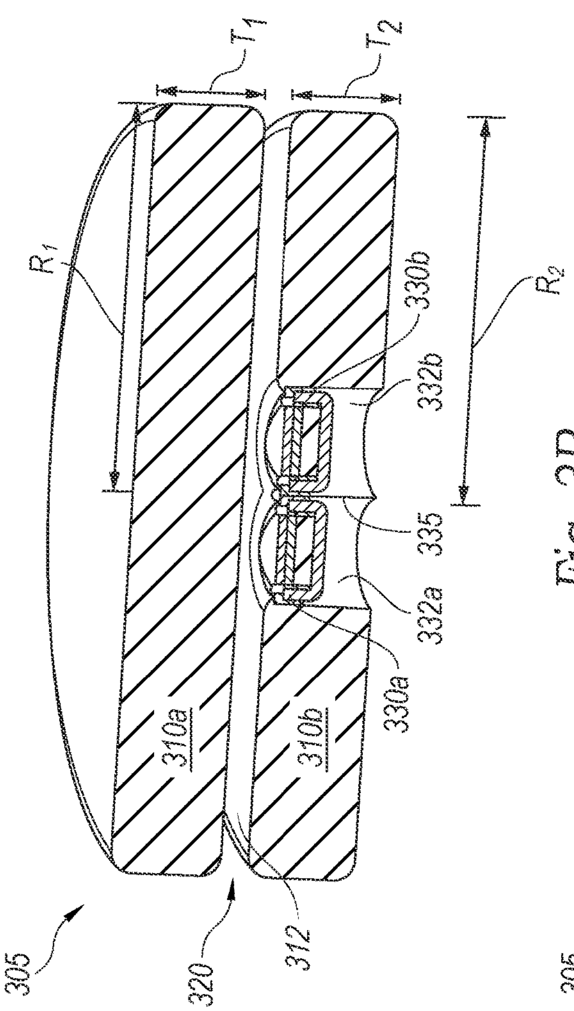
FIGS. 3B and 3C are partially schematic cross-sectional isometric and side views, respectively, of an audio playback device configured in accordance with examples of the present technology.
Figure 3C:
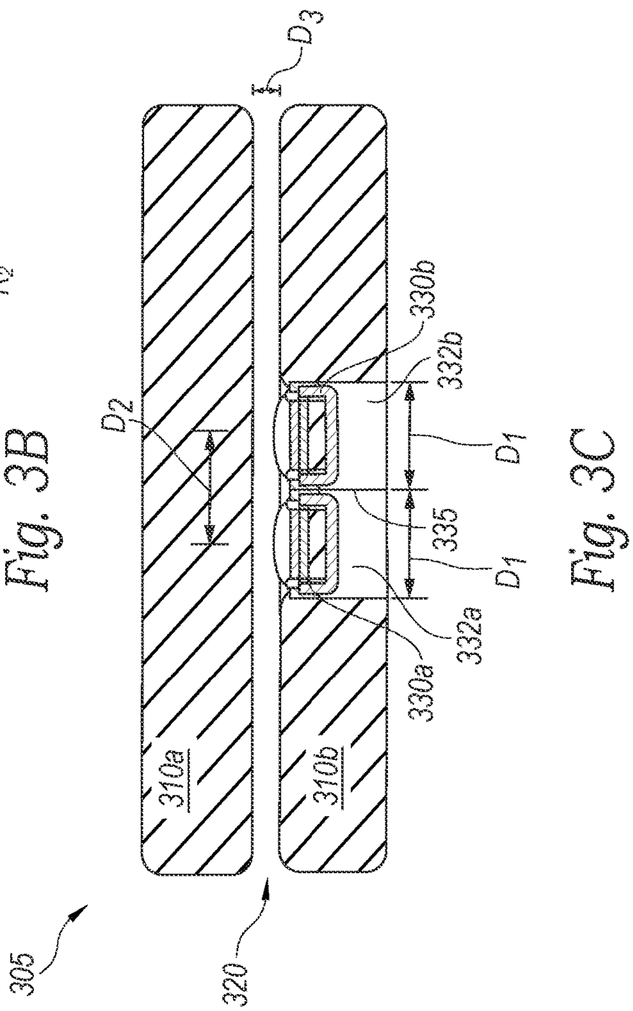

FIGS. 3B and 3C are partially schematic cross-sectional isometric and side views, respectively, of the audio playback device 305 configured in accordance with examples of the present technology. Referring to FIGS. 3B and 3C together, the device 305 can generally correspond to or be incorporated within any of the playback devices (e.g., playback devices 110, 120, or 210) previously described with reference to FIGS. 1A-2C. In some examples, the device 305 can be a wide dispersion device (WDD) configured to emit acoustic waves in a widely dispersed manner across a range of at least 180° (e.g., 270° or 360°).

Figure 7:
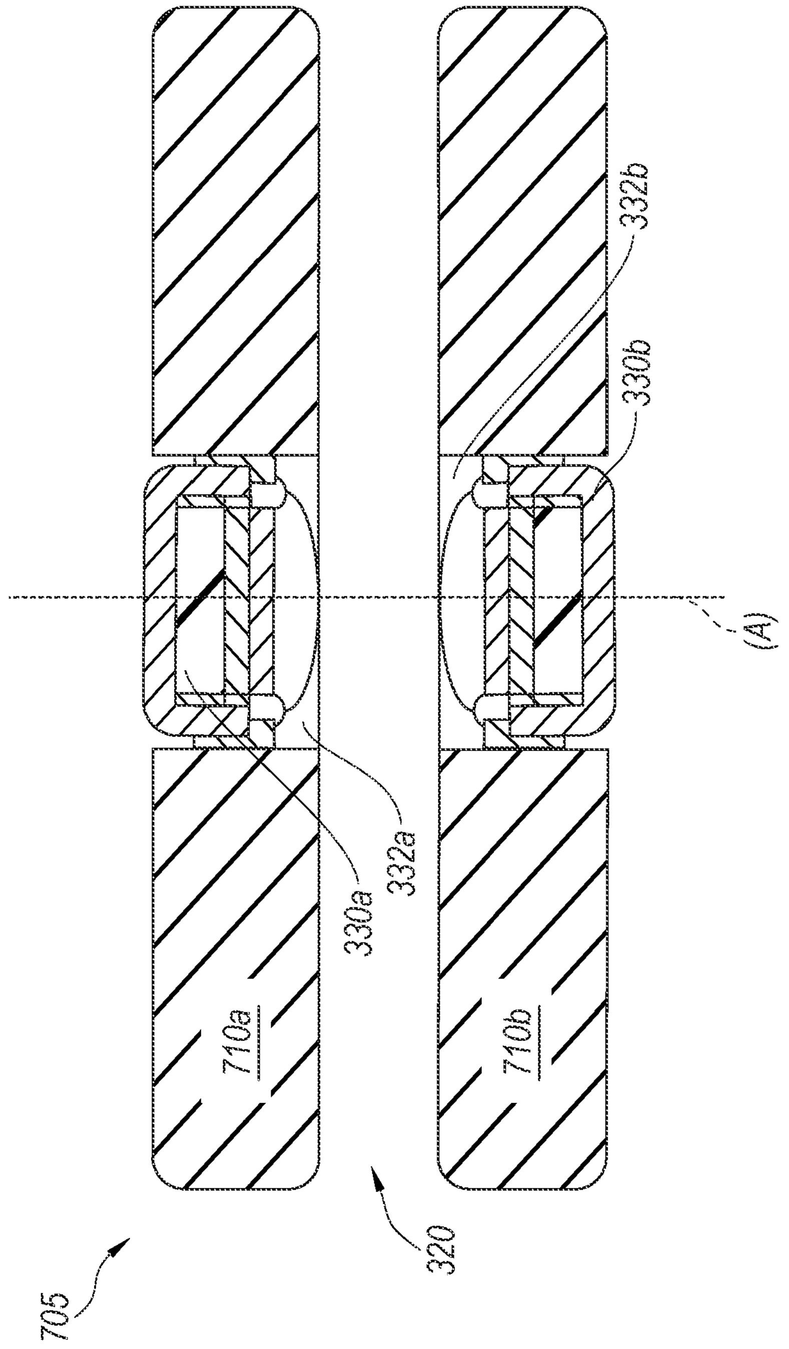
Figure 8:
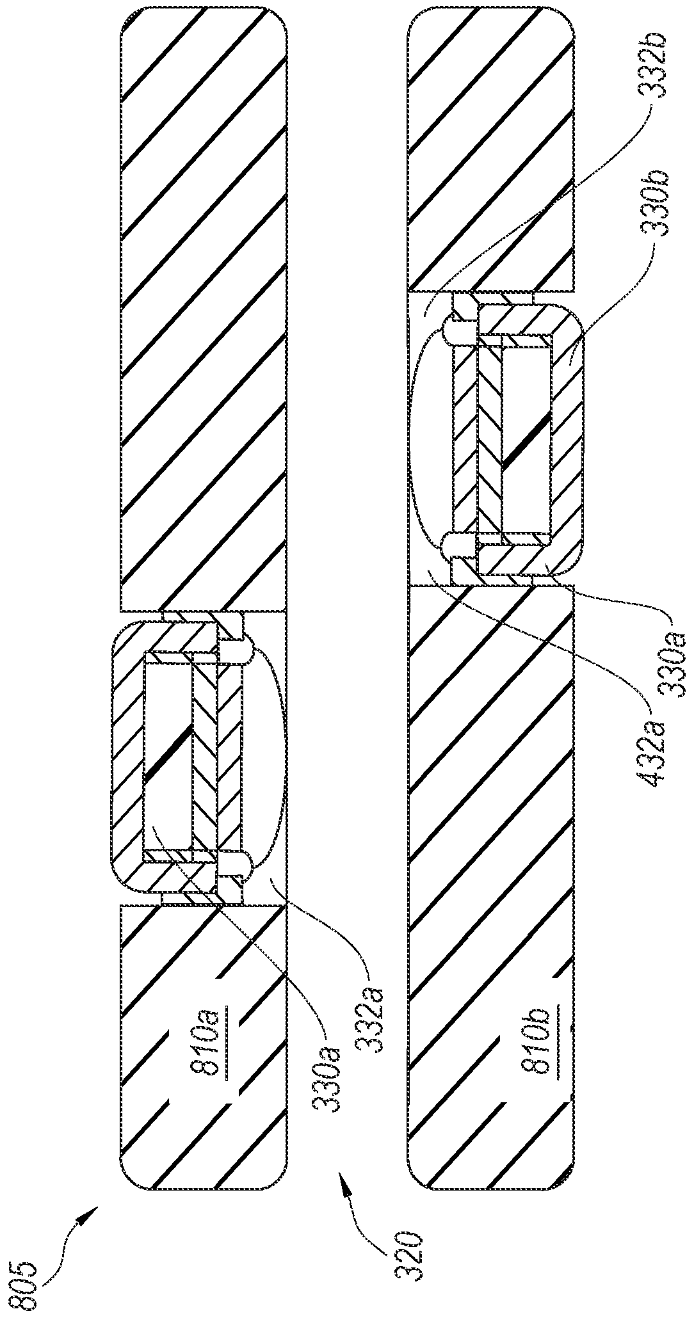
Figure 9:
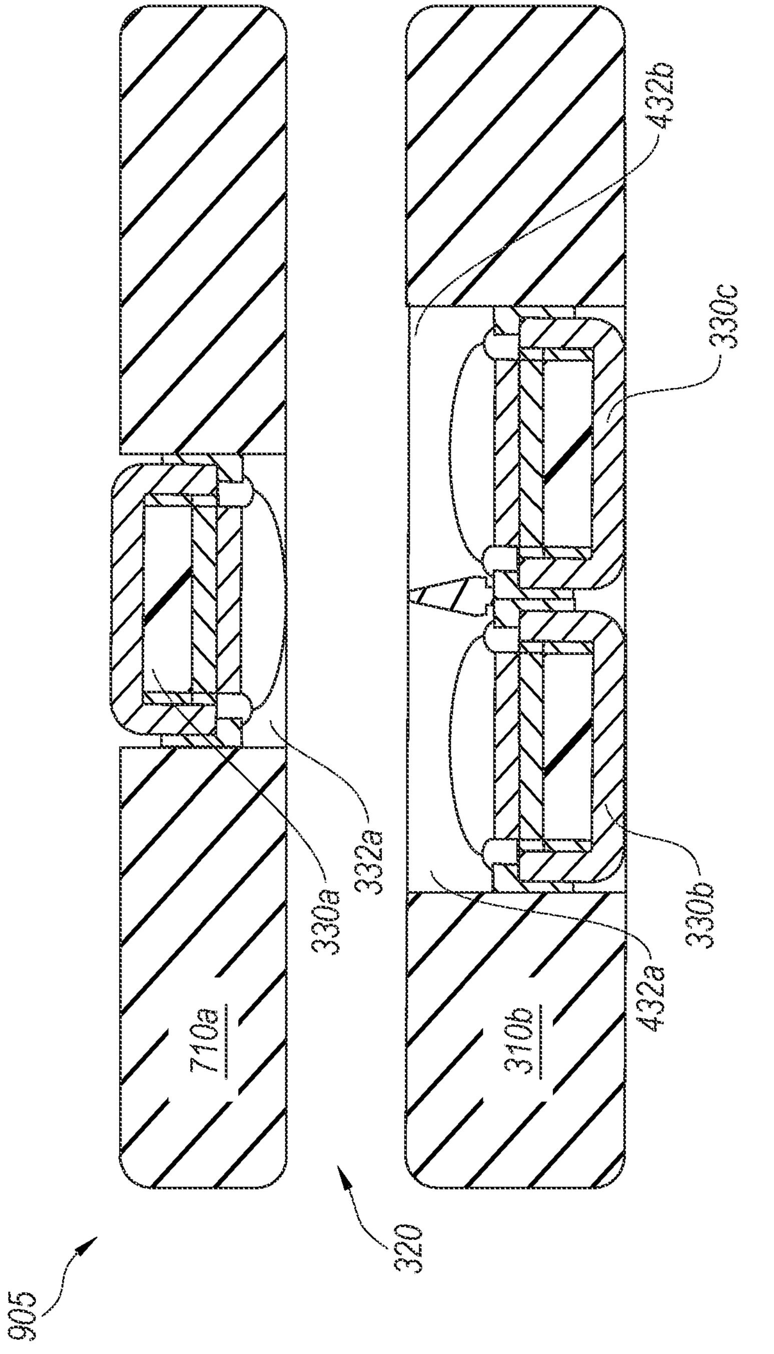

The device 305 can include a housing and an array of transducers. The housing of the device 305 can include a first plate 310*a* and a second plate 310*b* facing at least partially toward the second plate 310*b* to form an opening 320 therebetween. The plates 310*a-b* can each take the form of or include an acoustically reflective plate, a baffle, a basket, or combinations thereof. The array of transducers can include a first transducer 330*a* and a second transducer 330*b* positioned adjacent the first transducer 330*a*. In some examples, (i) both the first and second transducers 330*a-b* may be positioned within the first plate 310*a* (e.g., as shown in FIG. 3B) or the second plate 310*b*, or (ii) the first transducer 330*a* may be positioned in the first plate 310*a* and the second transducer may be positioned in the second plate 310*b* (e.g., as shown in FIGS. 7-9). Each of the array of transducers can include one or more tweeters and/or other suitable transducers described elsewhere herein, and may be configured to produce acoustic waves having a frequency of at least 1.5 kHz. In some examples, the array of transducers may include one or more transducers configured to produce acoustic waves have a frequency less than 1.5 kHz (e.g., mid-range transducers). In certain examples, the array of transducers lacks any transducers configured to produce acoustic waves having a frequency of at least 1.5 kHz.

As shown in FIG. 3C, the second plate 310*b* can include a first channel 332*a* within which the first transducer 330*a* is disposed, and a second channel 332*b* within which the second transducer 330*b* is disposed. The channels 332*a-b* may be laterally isolated from one another, e.g., via a barrier 335 such that acoustic waves generated from the transducers 330*a-b* initially interact with one another at the opening 320. The transducers 330*a-b* may be positioned anywhere along the respective channels 332*a-b*. For example, as shown in FIG. 3C, the transducers 330*a-b* may be positioned generally at or near an upper surface 312 of the second plate 310*b*. Alternatively, the transducers 330*a-b* may be recessed within the respective channels 332*a-b* and be spaced apart from the upper surface 312.

The first plate 310*a* may include a first thickness ($T_1$) and the second plate may include a second thickness ($T_2$), which may differ or be generally the same as the first thickness ($T_1$). In some examples, the second thickness ($T_2$) may be greater than the first thickness ($T_1$), or vice versa, to accommodate the transducers 330*a-b* and/or the channels 332*a-b*. In some examples, for instance, each of the first thickness and the second thickness ($T_1$, $T_2$) is (i) at least 10 mm, (ii) no more than 100 mm, and/or (iii) within a range of 10 mm-100 mm, including any incremental value therebetween (e.g., 20 mm, 35 mm, 50 mm, 75 mm, etc.). In some examples, the first thickness and/or the second thickness ($T_1$, $T_2$) can have another suitable thickness less than 10 mm or greater than 100 mm.

As shown in FIG. 3C, each of the plates 310*a-b* can have a generally circular shape. Such examples may be beneficial in that the path length of acoustic waves from the transducers 310*a-b* to an edge of the plates 310*a-b* in any direction is generally the same, thereby allowing audio output to be experienced in the same manner irrespective of where a listener is relative to the device 305. In some examples, each of the plates 310*a-b* has a respective radius ($R_1$, $R_2$) (i) of at least 15 mm, (ii) no more than 500 mm, and/or (iii) within a range of 15 mm-500 mm, including any incremental value therebetween (e.g., 50 mm, 100 mm, 200 mm, 250 mm, etc.). In some examples, the first radius $R_1$ and/or the second radius $R_2$ have dimensions less than 25 mm and/or greater than 500 mm. In some examples, the plates 310*a-b* can have a shape other than circular. For example, the plates 310*a-b* may have an elliptical, rectangular, polygonal, and/or another suitable shape. In such examples, the width and/or length dimensions of the plates 310*a-b* may be similar to twice the radii described above. For instance, in some examples, the first plate 310*a* and/or the second plate 310*b* has a square shape with one side having a length that is two times the corresponding $R_1$ and/or $R_2$ described above. In some examples, the first plate 310*a* and/or the second plate 310*b* have a polygonal shape whose dimensions differ from those described above with respect to $R_1$ and/or $R_2$ but whose shape has a similar surface area as the generally circular shape(s) described above.

As shown in FIG. 3C, each of the transducers 330*a-b* and/or channels 332*a-b* can have a cross-sectional dimension ($D_1$) (i) of at least 5 mm, (ii) no more than 100 mm, and/or (iii) within a range of 5 mm-100 mm, including any incremental value therebetween. As further shown in FIG. 3C, the transducers 330*a-b* and/or channels 332*a-b* can be spaced apart from one another such that the center-to-center distance ($D_2$) is (i) at least 5 mm, (ii) no more than 1 cm, or (iii) within a range of 5 mm-1 cm, including any incremental value therebetween.

As explained elsewhere herein, the relatively close proximity of the transducers 330*a-b* to one another within the first plate 310*a* and/or the second plate 310*b* can enable audio output patterns of each of the transducers 330*a-b* to overlap in a manner that produces a desirable widely dispersed listening experience. Conventionally, it has been considered undesirable to have high-frequency transducers (e.g., tweeters) positioned relatively close to one another, as doing so may lead to undesirable interference patterns. However, examples of the present technology utilize the close proximity of the transducers (e.g., as shown in FIGS. 3B and 3C) to enable the beneficial combination between the audio output patterns of each of the transducers 330*a-b*, which would be more difficult if the transducers 330*a-b* were spaced apart further. In some examples, placing two transducers near one another can enable operation of the transducer pair as a dipole, in which the acoustic waves output by the individual transducers combine to provide a desired output with high directivity for certain channels (e.g., with distinct left and right channel outputs directed along distinct axes) and a wide spaciousness (e.g., wide dispersion of a center channel output).

In some examples, the enhanced listening experience provided by the disclosed technology is further emphasized for multichannel playback in which stereo output is produced using a sum-difference approach. In such examples, a center channel and one or more side channels of audio content may be generated from combinations and/or differences of left and right channels of audio input content, and be provided to different transducers or audio drivers of the device 305. For example, the first transducer 330*a* may be provided a combination of the left and right channel signals and/or a difference of the left and right channel signals, and the second transducer 330*b* may be provided a combination of the left and right channel signals and/or a difference of the right and left channel signals. Without being bound by theory, the relative proximity of the transducers 330*a-b*, and in part the wide dispersion effect provided via the opening 320 of the wide dispersion device 305, enable the wide dispersion device 305 to produce an enhanced listening experience with stereo audio output. Additional detail regarding sum-difference processing and related concepts is described in U.S. application Ser. No. 16/557,827, titled SUM-DIFFERENCE ARRAYS FOR AUDIO PLAYBACK DEVICES, filed Aug. 30, 2019, the disclosure of which is incorporated herein by reference in its entirety.

Figure 6:
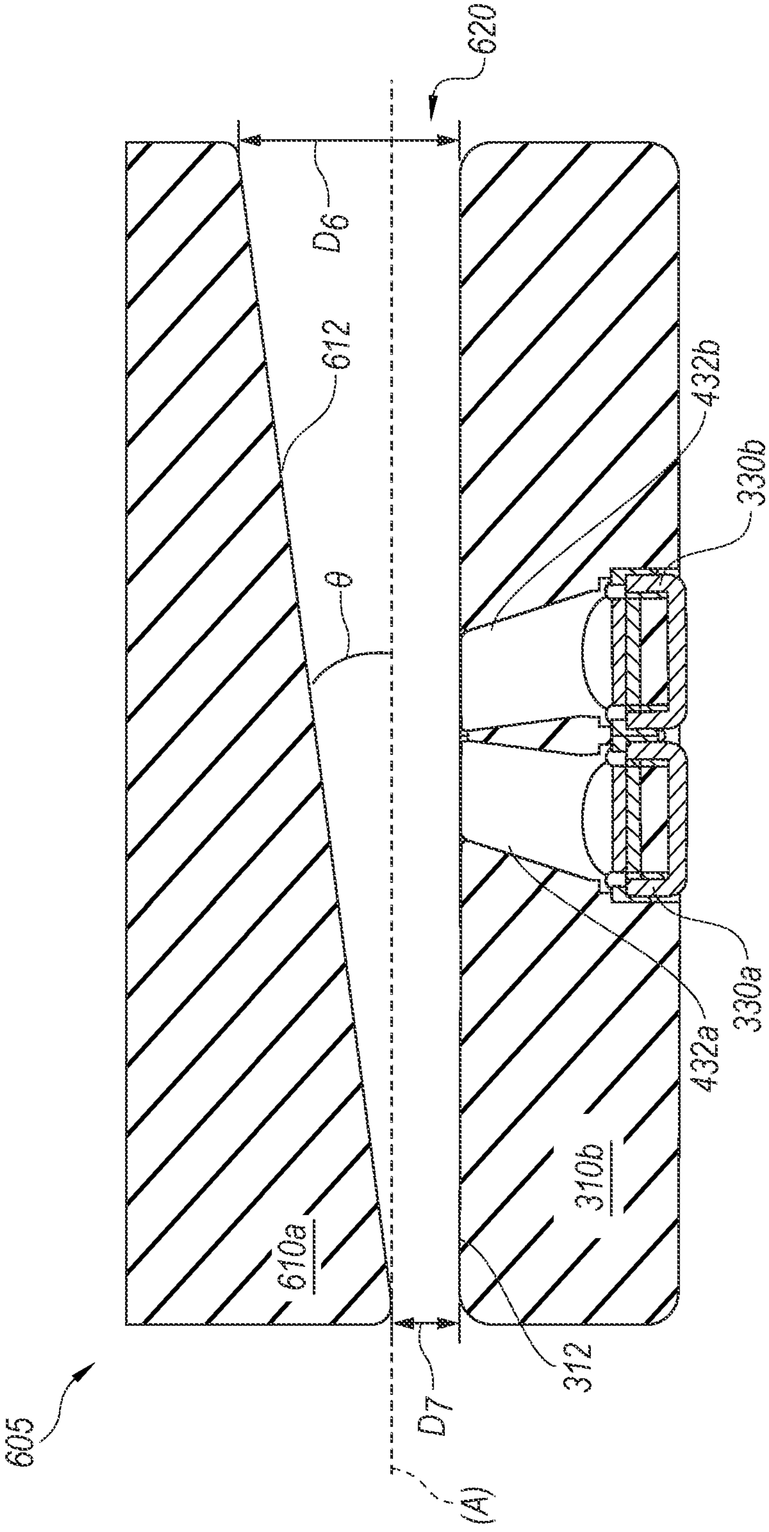
FIGS. 6-9 are partially schematic cross-sectional side views of other audio playback devices configured in accordance with examples of the disclosed technology.

As further shown in FIG. 3C, the first plate 310*a* can be spaced apart from the second plate 310*b*, such that the opening 320 has a dimension ($D_3$). The dimension ($D_3$) may have a minimum opening to enable adequate air flow between the first and second plates 310*a-b*, and a maximum opening depending on a desired vertical dispersion profile of acoustic waves from the device. In some examples, the opening 320 is based on other aspects of the first plate 310*a* and/or second plate 310*b*, such as its radius, thickness, shape, or other structural features. The dimension ($D_3$) can be (i) at least 2 mm, (ii) no more than 20 mm, or (iii) within a range of 2 mm-20 mm, including any incremental value therebetween. The spacing between the plates 310*a-b* may be provided via pillars (not shown) or other structures used in the art disposed between the plates 310*a-b*. As shown in FIG. 3C, the spacing between the plates 310*a-b* can be generally constant along a cross-sectional lateral dimension of the plates 310*a-b*. In other examples (e.g., as shown in FIG. 6), the spacing between the plates may vary such that one end has a larger opening than the other end. Additional detail regarding the size and configuration of the opening 320 is described in U.S. application Ser. No. 15/942,819, now U.S. Pat. No. 10,397,694, titled PLAYBACK DEVICES HAVING WAVEGUIDES, filed Apr. 2, 2018, the disclosure of which is incorporated herein by reference in its entirety.

Figure 4:
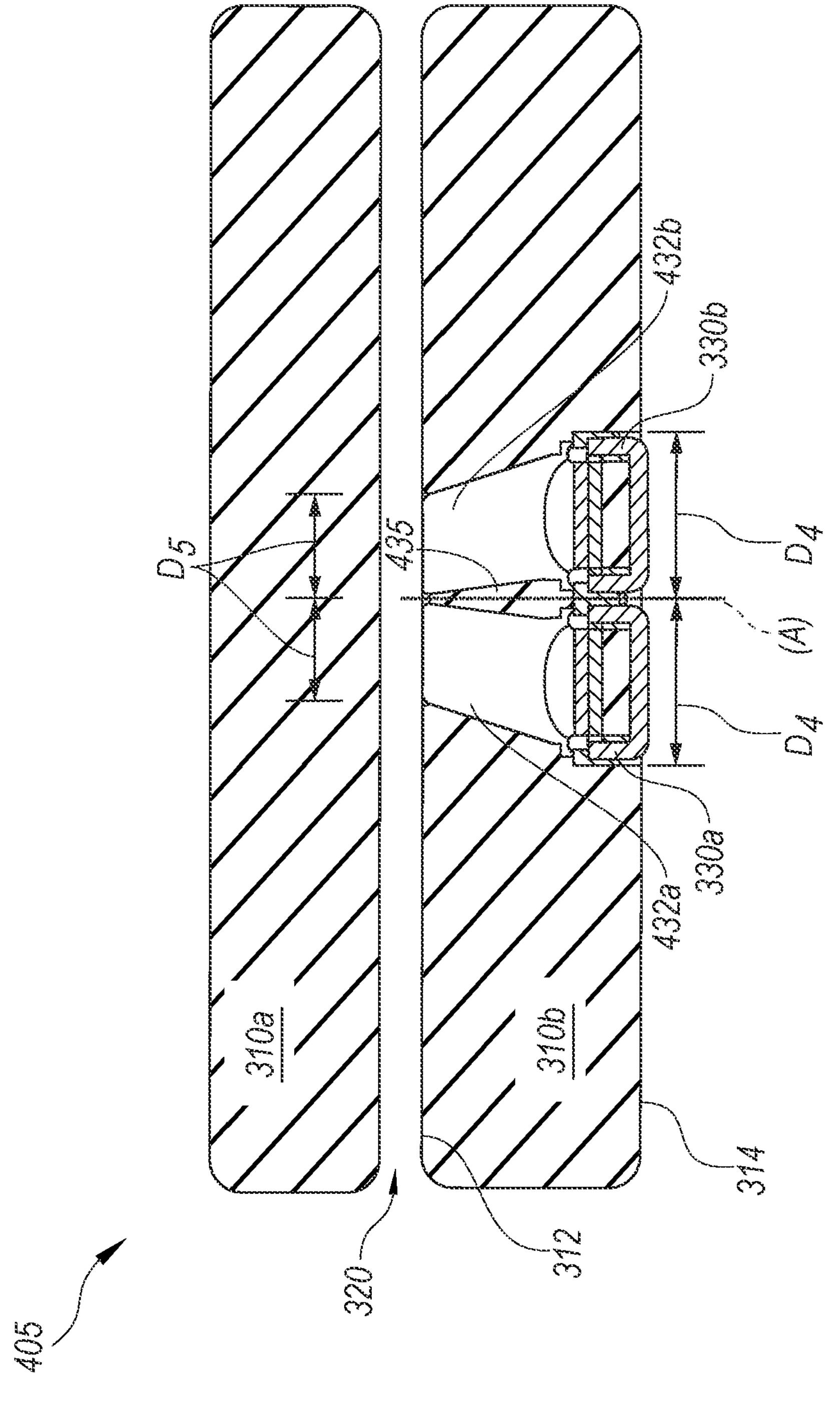
FIG. 4 is a partially schematic cross-sectional side view of another audio playback device configured in accordance with examples of the disclosed technology.

FIG. 4 is a partially schematic cross-sectional side view of another wide dispersion audio playback device 405, configured in accordance with examples of the present technology. As shown in FIG. 4, the device 405 includes some features generally similar to the device 305. For example, the device 405 includes the transducers 330*a-b*, the plates 310*a-b*, and the opening 320 between the plates. As shown in FIG. 4, the second plate 310*b* includes channels 432*a-b* that are spaced apart from one another via a barrier 435, which may help ensure acoustic waves generated from the transducers 330*a-b* initially interact with one another at the opening 320. The transducers 330*a-b* are disposed within the respective channels 432*a-b* and recessed relative to the upper surface 312 of the second plate 310*b*. That is, the transducers 330*a-b* are spaced apart from the upper surface 312 of the second plate 310*b*. Each of the channels 432*a-b* can be angled toward one another and/or a central portion of the upper surface 312. In some instances, for example, the angle of the inner surface of each of the channels 432*a-b* relative to an axis (A) extending between the transducers 330*a-b*, is (i) at least 5°, (ii) no more than 45°, or (iii) within a range between 5°-45°, or any incremental value therebetween. Additionally or alternatively, each of the channels 432*a-b* are tapered in a direction toward the opening 320. That is, the channels 432*a-b* have a cross-sectional dimension ($D_4$) at the lower surface 314 of the second plate 310*b* and a smaller cross-sectional dimension ($D_5$) at the upper surface 312 of the second plate 310*b*. In doing so, the generated acoustic waves from the transducers 310*a-b* can be focused toward one another and/or a central portion of the opening 320. Without being bound by theory, this may help the acoustic waves from each of the transducers 330*a-b* overlap with one another in a manner to produce a desirable listening experience and avoid undesired interference.

Figure 5A:
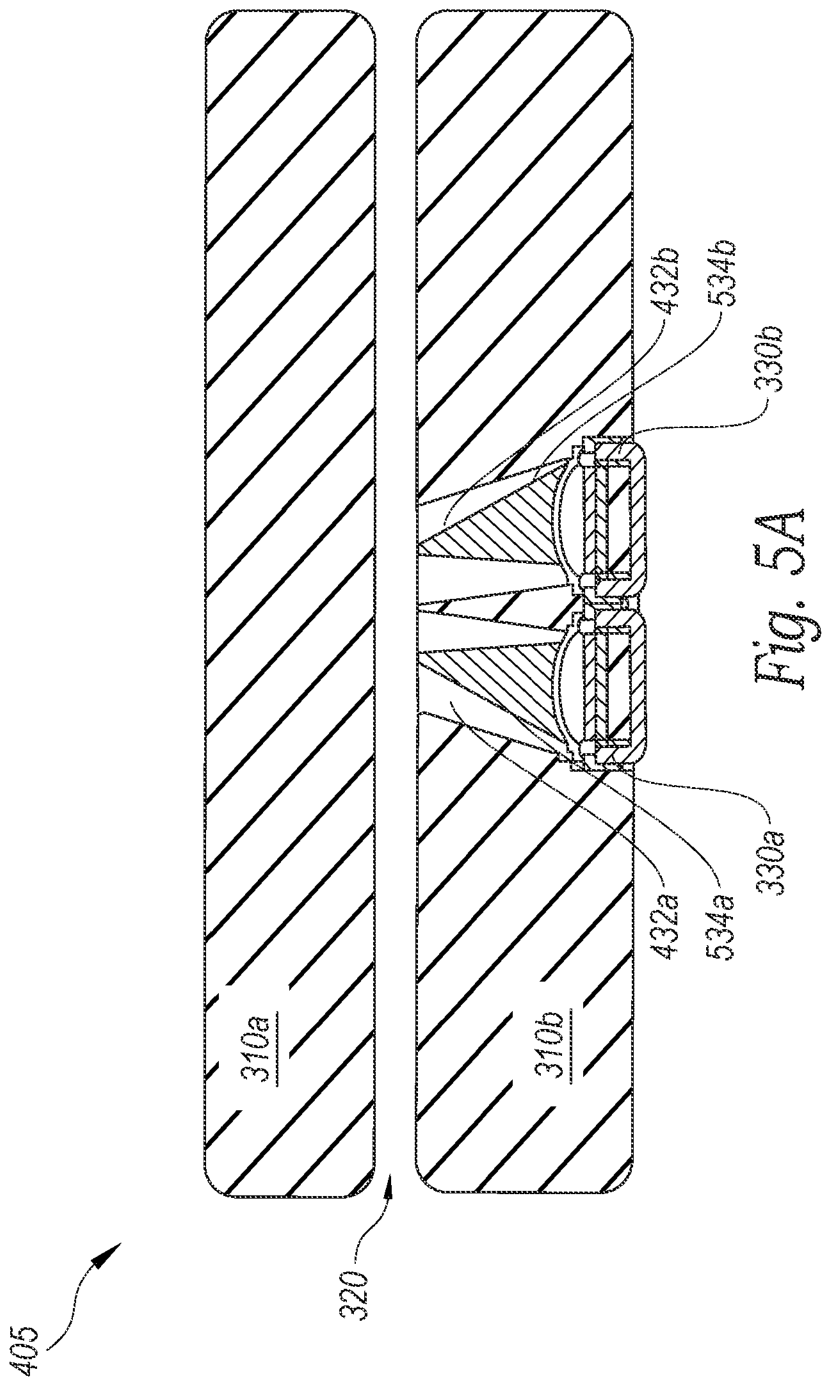
FIGS. 5A and 5B are partially schematic cross-sectional and isometric side views of an example of the audio playback device shown in FIG. 4.
Figure 5B:
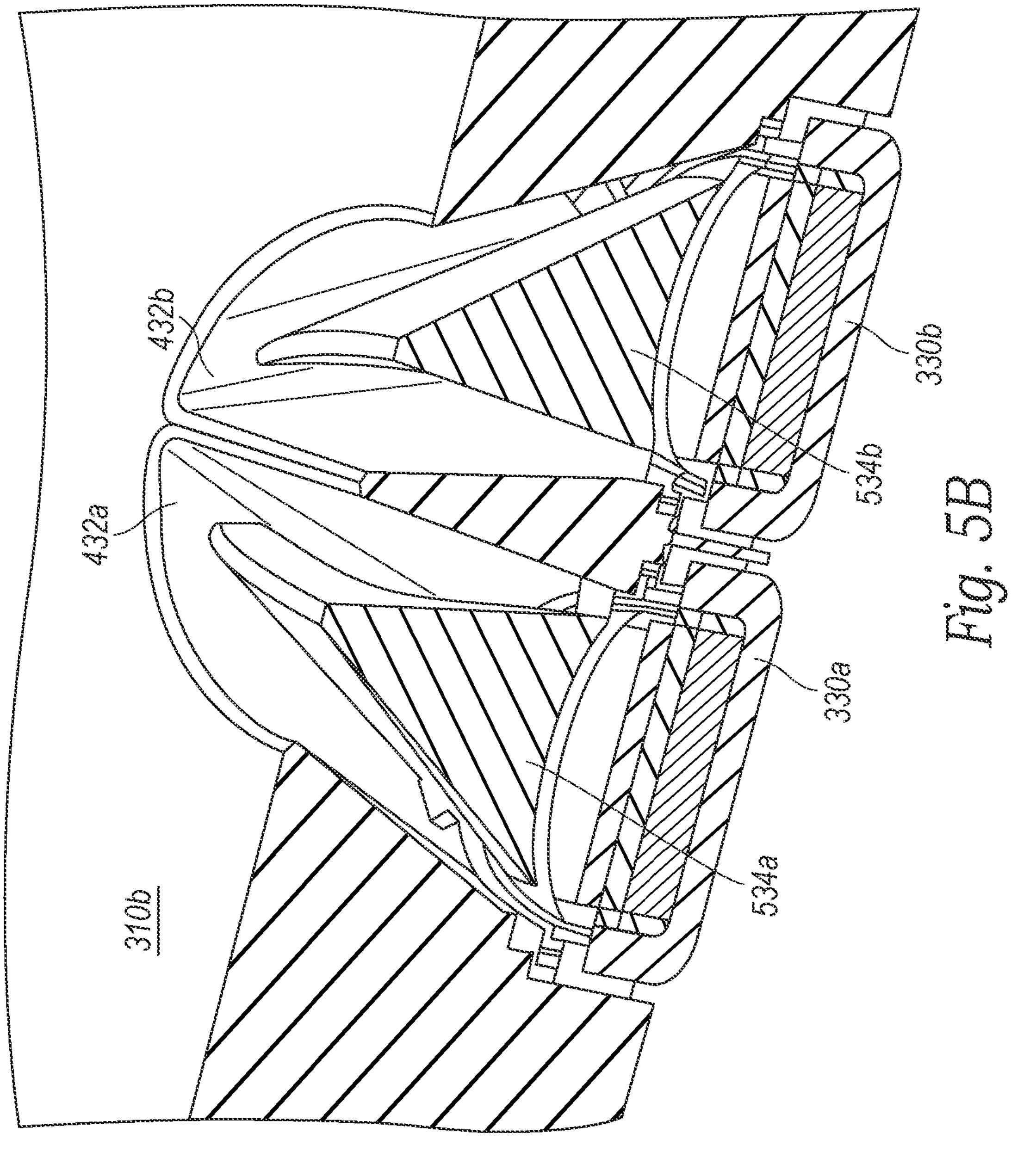

FIGS. 5A and 5B are partially schematic cross-sectional side and isometric views, respectively, of an example of the device 405 shown in FIG. 4. Referring to FIGS. 5A and 5B together, the device 405 can further include tapered members 534*a-b* (e.g., horns, phase plugs, etc.) disposed at least partially within the respective channels 432*a-b* and between the opening 320 and respective transducers 330*a-b*. The members 534*a-b* can each have a shape that tapers in a direction toward the opening 320 and/or away from the transducers 330*a-b*. In operation, the members 534*a-b* can cause the acoustic waves to exit the transducers 330*a-b* at peripheral ends thereof. Stated differently, the bottom portion of the members 534*a-b* can cover all or a portion of the diaphragm of the respective transducers 330*a-b* such that the acoustic waves are forced outwardly toward side surfaces of the respective channels 432*a-b*. In doing so, the members 534*a-b* can better maintain the acoustic waves in phase, and thereby prevent or inhibit the waves from cancelling each other out.

FIG. 6 is a partially schematic cross-sectional view of a wide dispersion audio playback device 605, configured in accordance with examples of the disclosed technology. The device 605 includes the second plate 310*b*, as previously described, and a first plate 610*a* disposed over the second plate 310*b* to define an opening 620 therebetween. The first plate 610*a* is generally similar to the plates previously described, but includes a surface 612 that in part defines the opening 620. The surface 612 is angled relative to a horizontal axis (A) and/or upper surface 312 of the second plate 310*b*, such that a dimension ($D_6$) corresponding to the opening 620 at a first end of the device 605 is greater than a dimension ($D_7$) corresponding to the opening 620 at a second, opposing end of the device 605. The angle (θ) of the surface 612 relative to the axis (A) and/or upper surface 312 of the second plate 310*b* can be (i) at least 5°, (ii) no more than 45°, or (iii) within a range between 5°-45°, or any incremental value therebetween. In operation, the larger opening at one end of the device 605 relative to the other can allow more directionality to be applied to the generated acoustic waves from the transducers 330*a-b,* which may be beneficial when a listener wants more audio output directed toward a particular area (e.g., the front of a room).

FIG. 7 is a partially schematic cross-sectional view of a wide dispersion audio playback device 705 configured in accordance with examples of the disclosed technology. The device 705 includes a first plate 710*a* and a second plate 710*b* facing at least partially toward and positioned adjacent the first plate 710*a* to define the opening 320 therebetween. The first and second plates 710*a-b* can have the same general features as the first and second plates 310*a-b* described elsewhere herein. The first plate 710*a* includes the first transducer 330*a* disposed within the first channel 332*a*, and the second plate 710*b* includes the second transducer 330*b* disposed within the second channel 332*b*. As shown in FIG. 7, the transducers 330*a-b* face toward one another and are generally aligned along a vertical axis (A).

In some examples, the transducers 330*a-b* may face only partially toward one another and/or may be askew or laterally offset from one another. For example, as shown in FIG. 8, which is a partially schematic cross-sectional view of a wide dispersion audio playback device 805 configured in accordance with examples of the disclosed technology, the device 805 includes a first plate 810*a* and a second plate 810*b* facing at least partially toward and positioned adjacent the first plate 810*a* to define the opening 320 therebetween, as previously described. The first and second plates 810*a-b* can have the same general features as the respective first and second plates 310*a-b* described elsewhere herein. The first plate 810*a* includes the first transducer 330*a* disposed within the first channel 332*a*, and the second plate 810*b* includes the second transducer 330*b* disposed within the second channel 332*b*. As shown in FIG. 8, the first transducer 330*a* faces toward the second plate 810*b* and the second transducer 330*b* faces toward the first plate 810*a*. The first transducer 330*a* is laterally offset from, and thus not vertically aligned with, the second transducer 330*b*. Without being bound by theory, the offset positioning of the first and second transducers 330*a-b* can help audio output patterns produced therefrom overlap in a manner that produces a desirable listening experience and/or limits undesirable interference. In some examples, a portion of the first transducer 330*a* may overlap (e.g., be disposed over) a portion of the second transducer 330*b*, while still not being vertically aligned with the second transducer 330*b*. In such examples, the center-to-center distance between the transducers 330*a-b* is less than the minimum center-to-center distance allowed for two transducers positioned side-by-side within the same plate (e.g., as shown in FIGS. 3B and 3C). This close proximity of transducers 330*a-b* facing one another, as shown in FIG. 8, can enable audio output patterns produced from the transducers 330*a-b* to overlap in a manner that produces a desirable listening experience and/or limits undesirable interference.

FIG. 9 is a partially schematic cross-sectional view of a wide dispersion audio playback device 905 configured in accordance with examples of the disclosed technology. The device 905 includes a combination of features previously described, including the first plate 710*a* (as described with reference to FIG. 7) and the second plate 310*b* (as described with reference to FIG. 4) disposed adjacent the first plate 710*a* to define the opening 320. As shown in FIG. 9, the first plate 710*a* includes a first transducer 330*a*, and the second plate 310*b* includes second and third transducers 330*b-c*. The second and third transducers 330*b-c* disposed within the second plate 310*b* are in apposition to one another (e.g., as described with reference to the first and second transducers 330*a-b* in FIG. 3C), and are each laterally offset from, and thus not vertically aligned with, the first transducer 330*a* disposed within the first plate 710*a*. That is, as shown in FIG. 9, the center point of the second transducer 330*b* is spaced apart from the center point of the first transducer 330*a* in a first direction, and the center point of the third transducer 330*c* is spaced apart from the center point of the first transducer 330*a* in a second, opposing direction. Without being bound by theory, the offset positioning of the first, second, and third transducers 330*a-c* can help audio output patterns produced from the transducers 330*a-c* to overlap in a manner that produces a desirable listening experience and/or limits undesirable interference.

Figure 10:
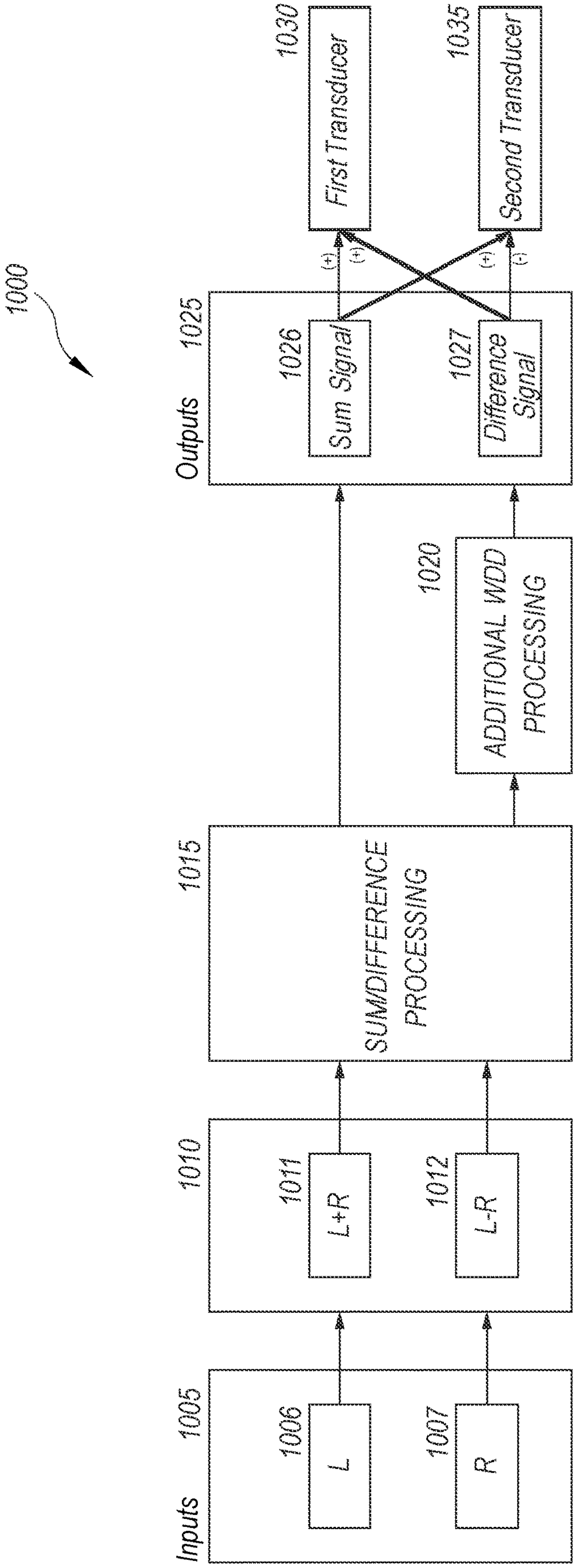
FIG. 10 is a schematic block diagram of an audio system including sum/difference processing.

FIG. 10 is a schematic block diagram of a system 1000 including sum/difference processing, configured in accordance with examples of the disclosed technology. The system 1000 can generally include a number of DSPs, filters, and/or other suitable audio processing to produce a stereo audio content having the desired phase and/or frequencies. The features described with reference to FIG. 10 and/or the system 1000 may be incorporated into any of the devices described elsewhere herein.

As shown in FIG. 10, the system 1000 can include a first block 1005 having a left (L) input signal 1006 and a right (R) input signal 1007, which are provided to a second block 1010 to create a sum (L+R) signal 1011 and a difference (L−R and/or R−L) signal. These sum and differences signals 1011, 1012 are provided to a sum/difference processing block 1015, which may apply one or more filters (e.g., low pass filters) as well as gain and/or delay to each of the sum and difference signals 1011, 1012 to produce modified sum and difference signals, respectively.

The system 1000 can further include an additional WDD processing block 1020 configured to further modify the modified signal provided from block 1015. Without being bound by theory, block 1020 may be needed to account for acoustic wave reflection (e.g., at the edges of the plates referred to herein) that is particular to wide dispersion playback devices. As such, the block 1020 may provide additional filtering to the modified signals from the block 1015 to ensure the audio output signals provided to the transducers and/or audio drivers have the correct radiation patterns and/or polarity for wide dispersion playback devices. In some examples, the block 1020 may determine or be provided magnitudes and/or phases for multiple discrete frequencies that are believed to produce desired radiation patterns. The block 1020 may utilize a filter (e.g., a Finite Impulse Response (FIR) filter) to apply least square error analysis to the magnitudes and/or phases of the multiple discrete frequencies to generate a resulting fit, which can then be applied to the modified sum or difference signals provided via block 1015. As shown in FIG. 10, block 1020 is applied only to the modified difference signal 1027. However, in some examples the block 1020 may instead be applied only to the modified sum signal 1026.

As further shown in FIG. 10, the sum signal 1026 may be provided to each of the first and second transducer 1030, 1035 (e.g., transducers 330*a-b*) with a positive polarity, and the modified difference signal 1027 may be provided to the first transducer 1030 with a positive polarity and to the second transducer 1035 with a negative polarity. As a result of the system 1000, sum and difference signals 1026, 1027 provided to output block 1025, and subsequently to the first and second transducers 1030, 1035, can each have a radiation pattern that produces a desirable stereo audio output. Additional detail regarding signal processing and related concepts is described in U.S. application Ser. No. 14/831,910, now U.S. Pat. No. 9,736,610, titled MANIPULATION OF PLAYBACK DEVICE RESPONSE USING SIGNAL PROCESSING, filed Aug. 21, 2015, the disclosure of which is incorporated herein by reference in its entirety.

Figure 11:
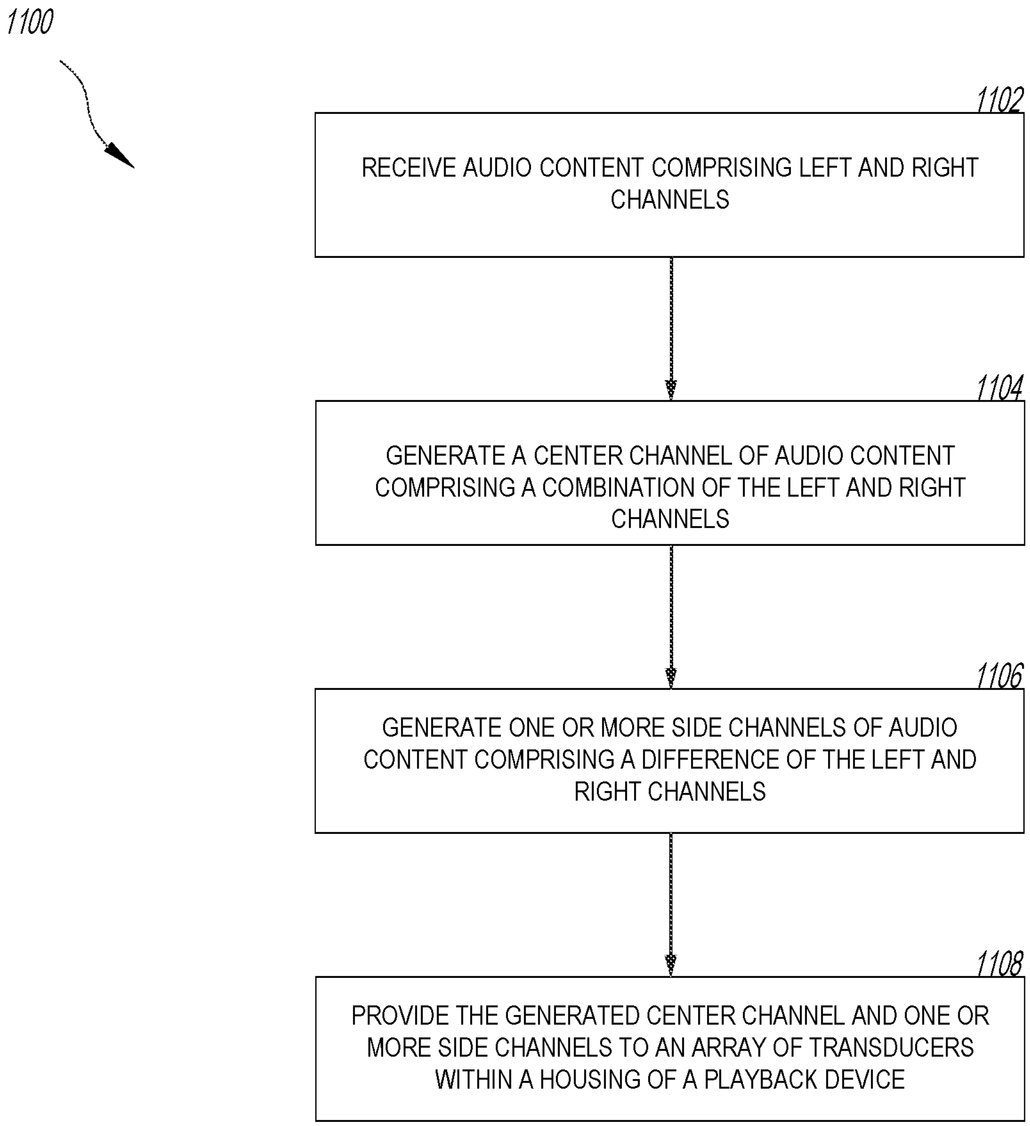
FIG. 11 is block flow diagram of a method for providing audio content to an array of transducers.

FIG. 11 is block flow diagram of a method 1100 for providing audio content to an array of transducers. The method 1100 can include receiving audio content comprising left and right channels (process portion 1102), which can then be used to generate multiple channels of audio output. For example, the method 1100 can further include generating a center channel of audio content comprising a combination of the left and right channels (process portion 1104), and generating one or more side channels of audio content comprising a difference of the left and right channels (process portion 1106). The generated center channel and one or more side channels can then be provided to an array of transducers (e.g., the transducers 330*a-b*) within a housing of an audio playback device (e.g., the device 305, 405, 605, 705, 805, or 905).

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Additionally, features described with reference to one of the figures may be combined with and/or replace features described in other individual figures. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Examples of the disclosed technology are described below as numbered clauses (1, 2, 3, etc.) for convenience. These are provided as examples and do not limit the disclosed technology. It is noted that any of the dependent clauses may be combined in any combination, and placed into a respective independent clause. The other clauses can be presented in a similar manner.

Clause 1: An audio device, comprising: a housing including a baffle and an acoustically reflective plate spaced apart from and facing at least partially toward the baffle, the baffle and the plate defining an opening therebetween; and an array of electroacoustic transducers disposed within or surrounded by the baffle and configured to emit acoustic waves toward the opening, wherein the array is configured to produce acoustic waves having a frequency of about 1.5 kilohertz (kHz) or greater.

Clause 2: The device of clause 1, wherein the array includes at least a first transducer and a second transducer positioned adjacent the first transducer such that the first and second transducers produce acoustic waves in substantially the same direction toward the plate.

Clause 3: The audio device of any one of the previous clauses, wherein the center to center distance between the first and second transducers is no more than 1 centimeter.

Clause 4: The audio device of any one of the previous clauses, further comprising a barrier between the first and second transducers, the barrier extending from the opening at a surface of the baffle and partially defining first and second acoustic channels extending from the first and second transducers, respectively, to the opening.

Clause 5: The audio device of any one of the previous clauses, wherein the first transducer is configured to produce acoustic waves directed toward the opening along a channel that decreases in diameter in a direction toward the opening.

Clause 6: The audio device of any one of the previous clauses, wherein the plate is tilted relative to the baffle such that the opening at a first side of the housing is larger than the opening at a second, opposing side of the housing.

Clause 7: The audio device of any one of the previous clauses, wherein the array comprises a first transducer, a second transducer, and a third transducer, wherein the third transducer is within the plate and faces at least partially toward at least one of the first transducer or the second transducer.

Clause 8: The audio device of any one of the previous clauses, wherein the third transducer has a larger diameter than that of each of the first transducer and the second transducer.

Clause 9: The audio device of any one of the previous clauses, wherein the device is configured to emit the acoustic audio waves across at least a 180 degree range.

Clause 10: The audio device of any one of the previous clauses, wherein at least one of the plate or the plate comprises a circular shape.

Clause 11: The audio device of any one of the previous clauses, wherein the array is configured to produce a stereo signal including left and right channel outputs.

Clause 12: A wide dispersion device configured to produce stereo output, the device comprising: a first transducer and a second transducer that together are configured to form a center dipole, wherein each of the first transducer and the second transducer is configured to produce acoustic waves having a frequency of at least 1.5 kilohertz (kHz); and a housing containing the first and second transducers, the housing including a first plate and a second plate facing at least partially toward the first plate, the first and second plates defining an opening therebetween that is in fluid communication with the first transducer and the second transducer.

Clause 13: The device of any one of the previous clauses, wherein the first and second transducers are positioned adjacent one another within the first plate such that the first and second transducers produce acoustic waves in substantially the same direction toward the second plate, and wherein the center to center distance between the first and second transducers is no more than 1 centimeter.

Clause 14: The device of any one of the previous clauses, further comprising a first channel extending from the opening and configured to receive acoustic waves produced via the first transducer, and a second channel extending from the opening and configured to receive acoustic waves produced via the second transducer Clause 15: The device of any one of the previous clauses, wherein the first channel is angled toward the second channel.

Clause 16: The device of any one of the previous clauses, wherein the first transducer is within the first plate and the second transducer is within the second plate such that the first transducer at least partially faces toward the second transducer.

Clause 17: The device of any one of the previous clauses, wherein at least one of the first plate and the second plate comprise a circular shape.

Clause 18: A playback device, comprising: one or more processors; and a non-transitory computer-readable medium storing instructions that, when executed by the one or more processors, causes the playback device to perform functions comprising—receiving a left channel of audio content and a right channel of audio content; generating a center channel of audio content comprising a combination of the left and right channels; and providing the center channel of audio content to an array of electroacoustic transducers contained within a housing of the playback device, the array including at least a first transducer and a second transducer spaced apart from the first transducer, wherein the array is configured to produce acoustic waves having a frequency of at least 1.5 kilohertz (kHz), the housing including a first plate and a second plate spaced apart from and facing at least partially toward the first plate, the first and second plates defining an opening in fluid communication with the first transducer and the second transducer.

Clause 19: The device of any one of the previous clauses, wherein generating the center channel of audio content is based at least in part on a sum and/or difference of the left and right channels of audio content.

Clause 20: The device of any one of the previous clauses, wherein generating the center channel comprises filtering the audio content based on least square error analysis.

Clause 21: An audio signal processing system of a playback device, the system comprising the device of any one of the previous clauses; a processor; tangible, non-transitory, computer-readable media storing instructions executable by the processor.

Clause 22: A network microphone device comprising one or more microphones configured to detect sound, the audio device of any one of the previous clauses; one or more processors; tangible, non-transitory, computer-readable media storing instructions executable by the one or more processors.

Clause 23: A playback device comprising a speaker; a processor; and a tangible, non-transitory computer-readable medium storing instructions executable by the processor, the speaker comprising the device of any one of the previous clauses.

The invention claimed is:

1. A playback device, comprising:

a housing including a baffle and an acoustically reflective plate spaced apart from and facing at least partially toward the baffle, the baffle and the plate defining an opening therebetween; and an array of electroacoustic transducers disposed within the baffle and configured to emit acoustic waves toward the opening, wherein the array is configured to produce acoustic waves having a frequency of about 1.5 kilohertz (kHz) or greater.

2. The device of claim 1, wherein the array includes at least a first transducer and a second transducer, wherein the second transducer is:

positioned substantially adjacent the first transducer; and oriented such that the first and second transducers produce acoustic waves in substantially the same direction toward the plate.

3. The device of claim 1, wherein a center to center distance between the first and second transducers is no more than 1 centimeter.

4. The device of an claim 1, further comprising a barrier between the first and second transducers, the barrier extending from the opening at a surface of the baffle and partially defining first and second acoustic channels that at least partially surround the first and second transducers, respectively, and extend from the opening.

5. The device of claim 1, wherein the first transducer is configured to produce acoustic waves directed toward the opening along a channel that decreases in diameter in a direction toward the opening.

6. The device of claim 1, wherein the plate is tilted relative to the baffle such that the opening at a first side of the housing is larger than the opening at a second, opposing side of the housing.

7. The device of claim 1, wherein the array comprises a first transducer, a second transducer, and a third transducer, wherein the third transducer is within the plate and faces at least partially toward at least one of the first transducer or the second transducer.

8. The device of claim 7, wherein the third transducer has a larger diameter or cross-sectional dimension than that of each of the first transducer and the second transducer.

9. The device of claim 1, wherein the device is configured to emit the acoustic waves across at least a 180 degree range.

10. The device of claim 1, wherein at least one of the plate or the baffle comprises a circular shape.

11. The device of claim 1, wherein the array is configured to produce a stereo signal including left and right channel outputs.

12. A method to be performed by the playback device of claim 1, the method comprising:

receiving a left channel of audio content and a right channel of audio content;

generating a center channel of audio content comprising a combination of the left and right channels; and providing the center channel of audio content to the array of electroacoustic transducers.

13. The method of claim 12, wherein generating the center channel of audio content is based at least in part on a sum and/or difference of the left and right channels of audio content.

14. The device of claim 12, wherein generating the center channel comprises filtering the audio content based on least square error analysis.

15. A wide dispersion device configured to produce stereo output, the device comprising:

a first transducer and a second transducer that together are configured to form a dipole, wherein each of the first transducer and the second transducer is configured to produce acoustic waves having a frequency of at least 1.5 kilohertz (kHz); and a housing containing the first and second transducers , the housing including a first plate and a second plate facing at least partially toward the first plate, the first and second plates defining an opening therebetween that is in fluid communication with the first transducer and the second transducer.

16. The device of claim 15, wherein the first and second transducers are positioned adjacent one another within the first plate such that the first and second transducers produce acoustic waves in substantially the same direction toward the second plate, and wherein the center to center distance between the first and second transducers is no more than 1 centimeter.

17. The device of claim 15, further comprising a first channel extending from the opening and configured to receive acoustic waves produced via the first transducer, and a second channel extending from the opening and configured to receive acoustic waves produced via the second transducer.

18. The device of claim 17, wherein the first channel is angled toward the second channel.

19. The device of claim 15, wherein the first transducer is within the first plate and the second transducer is within the second plate such that the first transducer at least partially faces toward the second transducer.

20. The device of exclaim 15, wherein at least one of the first plate and the second comprise a circular shape.

21. A playback device comprising the wide dispersion device of claim 15.

* * * * *